Aug. 6, 1929. R. L. ADAMS Re. 17,396
NUT LOCK
Original Filed Aug. 18, 1928
Fig I
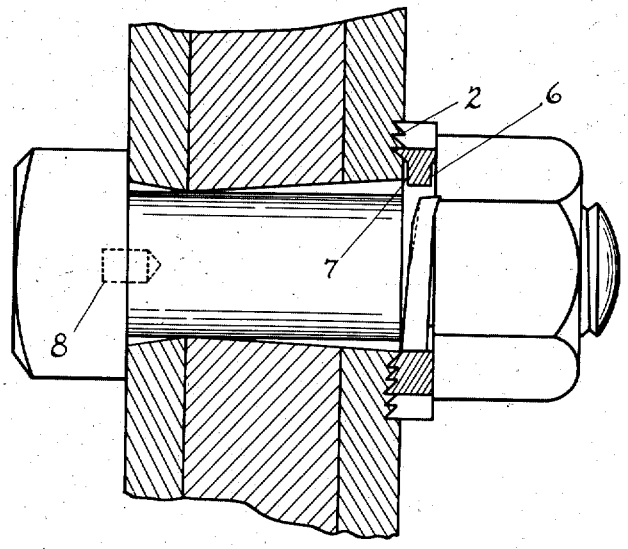
Fig II
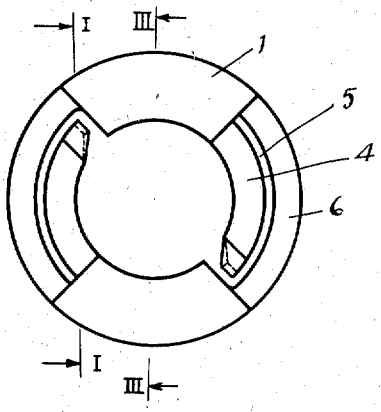
Fig III
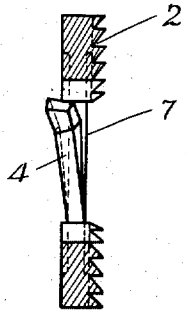
Fig IV
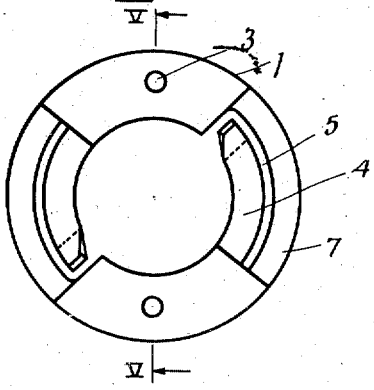
Fig V
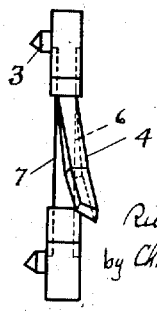
INVENTOR
Richard L. Adams
by Christy Christy and Wharton
his attorneys Reissued Aug. 6, 1929. Re. 17,396

UNITED STATES PATENT OFFICE.

RICHARD L. ADAMS, OF AVALON, PENNSYLVANIA.

NUT LOCK.

Original No. 1,715,883, dated June 4, 1929. Serial No. 300,543, filed August 18, 1928. Application for reissue filed June 18, 1929. Serial No. 371,878.

My invention relates to improvements in nut locks. The objects in view are simplicity and cheapness, facility of application, adequacy in service, and removability, combined in highest degree.

In the accompanying drawings, Fig. I is a view in section of the nut lock in service; Fig. II is a view in plan from above of the nut lock itself, detached from associate parts, and in Fig. II the plane of section of Fig. I is indicated by the line I—I. Fig. III is a view in section, on the plane indicated at III—III, Fig. II. Fig. IV is a view in plan from beneath of a nut lock which, with modification in detail, embodies the invention; and Fig. V is a view in section, on the plane indicated at V—V, Fig. IV.

The invention is found in a washer of particular and peculiar form, adapted to be introduced in the position in which washers ordinarily are introduced, encircling the bolt, and engaged by the nether surface of the nut, and clamped by the tightening of the nut between the nut and an opposite surface.

The washer of the invention is an annulus 1 of elastic metal, preferably of somewhat greater interior diameter than the diameter of the bolt with which it is to be used. On its nether face it is provided with means by which it engages the surface upon which it is applied, in an engagement which resists transverse strain in every direction. To this end, the nether face of the washer may be serrated, as indicatd at 2 in Figs. I and III. The serrations may be formed in the punching operation by which the washer may be shaped from a sheet of material. They are circular, concentric with the washer, and preferably, as shown, the outer wall of each serration is perpendicular to the plane of the surface of the washer, while the inner wall is inclined, and the edges of the serrations are sharp.

Alternatively, the washer may be provided on its nether face with outstanding pins 3, Figs. IV and V, adapted to enter recesses formed to receive them in the face of the body upon which the washer is to be applied. And manifestly this alternative lends itself to use, when the material of the body is as hard as that of which the washer itself is made. Refinements upon these particular means of effecting engagement between the washer and the body against which in service it is clamped, may manifestly be made; and other particular shapes for the serrations or other interruptions of surface continuity may be employed, to effect the slip-resistant engagement involved in the practice of my invention. It will, however, be remarked of the washer in both of the two forms shown, that when clamped to place, it is in effect itegral with the body upon which it is clamped, in this sense; that it is immovable upon that body transversely in every direction.

Two opposite and circumferentially extending tongues 4 are formed, conveniently they are cut from the substance of the washer and bent aside, so that their tips rise normally above the plane of the upper surface of the washer, as clearly appears in Figs. III and V. The characteristics of the tongues are that, being of one substance with, they spring from the body of the washer; they extend longitudinally in circumferential direction; they are free at their ends, and preferably they are severed from the body of the washer by cuts 5 of appreciable width, so that they have some free play in transverse direction; they protrude from the upper surface of the washer; they are preferably toothed at the end, with a sloping face to permit tightening of the nut and a vertical face to resist loosening of the nut (cf. Fig. I); there are two of them, oppositely placed and symmetrically arranged.

As shown in the drawings, the circumferential extent of each tongue is through a quadrant of the annulus. These quadrant portions of the annulus are preferably less in thickness than the complementary portions. The upper face of the annulus is over these portions countersunk, as indicated at 6, and the nether face also may be similarly countersunk, as indicated at 7. If the nether face be thus countersunk, the means described above for engagement with the surface of a body to which application is made, will ordinarily be confined to the complementary quadrants of the annulus. The upper surface is thus countersunk, to the end that instruments may be thrust beneath the nut when the lock is in service, to bend the tongues aside and effect release of the nut. The nether surface of the washer may be countersunk, to allow the tongues to yield more easily as the nut is tightened, and so to facilitate assembly.

In making application of the nut lock of my invention, the bolt hole should be formed somewhat larger than the bolt, as is indicated in Fig. I, and provision should be made, as by pin and groove connection indicated at 8, to hold the bolt secure against turning. When the bolt has been brought to place, the annulus is applied, in the position indicated in Fig. I, concentric with the bolt hole. The nut then is applied to the bolt and screwed down in the usual manner. The nut as it is tightened secures the washer upon the surface of the body upon which the bolting strain is exerted, against lateral displacement, and the tongues gradually carried by compression into the spaces from which they normally protrude, engage by their tips the nut, in such manner as to permit the continued turning of the nut in direction to tighten it, but to resist turning in opposite direction.

In service the tips of the two tongues serve as fulcrum points, to the end that tendencies to transverse movement of the nut, which otherwise might cause the nut to creep upon the threads of the bolt and to become loose, are by the presence of one of the tongues or the other resolved into two components, of which one is by the tongue itself met and overcome and the other tends not to loosen but to tighten the nut. It is essential to this action of the washer that, by such means as those described, it be in effect integral with the body upon which its nether surface makes engagement, immovable transversely in every direction.

When a bolt is to be released, instruments are introduced beneath the nut which force the tongues aside and effect disengagement. The nut may then be removed with ease.

I claim as my invention:

A nut lock consisting of an annulus of elastic metal with two opposite quadrants of greater and two of less thickness and provided with two tongues slit from its substance within the two quadrant portions of less thickness and bent aside, the tongues being oppositely arranged, integral at their roots with the body of the annulus, circumferentially extending, and free at their tips, and the nether face of the annulus within the quadrants of greater thickness being provided with means for uniting the annulus when under compression, integrally with another body.

In witness whereof, I hereunto set my hand.

RICHARD L. ADAMS.